US006560085B1

(12) United States Patent
Chen et al.

(10) Patent No.: US 6,560,085 B1
(45) Date of Patent: May 6, 2003

(54) CIRCUIT BREAKER INCLUDING POSITIVE TEMPERATURE COEFFICIENT RESISTIVITY ELEMENT AND CURRENT LIMITING ELEMENT

(75) Inventors: William W. Chen, Marion, IA (US); Randall L. Siebels, Cedar Rapids, IA (US); Steven C. Wilgenbusch, Cedar Rapids, IA (US)

(73) Assignee: Square D Company, Palatine, IL (US)

(*) Notice: Subject to any disclaimer, the term of this patent is extended or adjusted under 35 U.S.C. 154(b) by 0 days.

(21) Appl. No.: 09/468,219

(22) Filed: Dec. 20, 1999

(51) Int. Cl.[7] ............................ H02H 3/00; H02H 7/00; H02H 9/02; H02H 5/04

(52) U.S. Cl. ....................................... 361/103; 361/102

(58) Field of Search ................................ 361/102, 103, 361/138

(56) References Cited

U.S. PATENT DOCUMENTS 4,275,102 A * 6/1981 Trojer et al. ................ 429/119
4,349,831 A * 9/1982 Theroux ...................... 357/74
4,459,639 A * 7/1984 Heil ........................... 361/386
4,504,886 A * 3/1985 Cygan ........................ 361/386
5,253,261 A * 10/1993 Chaffee ....................... 372/34
5,493,101 A * 2/1996 Innes ......................... 219/502
5,644,283 A * 7/1997 Wilde et al. .................. 338/20
5,886,860 A 3/1999 Chen et al. .................... 361/9
5,933,311 A 8/1999 Chen et al. ................. 361/106
5,999,384 A 12/1999 Chen et al. .................... 361/42
6,020,802 A 2/2000 Larson et al. ............... 335/172
6,356,424 B1 * 3/2002 Myong ...................... 361/93.7

* cited by examiner

*Primary Examiner*—Brian Sircus
*Assistant Examiner*—Z Kitov
(74) *Attorney, Agent, or Firm*—Kareem M. Irfan; Larry I. Golden

(57) ABSTRACT

An apparatus and method for interrupting the flow of electrical current in a line is disclosed. The invention provides for better limitation of current than can be achieved in the prior art. With effective current limitation, the magnetic force generated by the circuit breaker coil will not be excessive thereby reducing potential damage to the circuit breaker armature, increasing the interruption rating of the circuit breaker and end-use equipment and decreasing the interruption pressure within the circuit breaker.

18 Claims, 5 Drawing Sheets

CIRCUIT BREAKER INCLUDING POSITIVE TEMPERATURE COEFFICIENT RESISTIVITY ELEMENT AND CURRENT LIMITING ELEMENT

CROSS REFERENCE TO RELATED APPLICATION

This application takes priority from copending U.S. patent application Ser. No. 09/054,153, filed on Apr. 2, 1998.

BACKGROUND OF THE INVENTION

1. Field of the Invention

This invention relates to the use of current limiting elements and positive temperature coefficient resistivity elements (PTC elements) in circuit breakers.

2. Description of the Related Art

Circuit breakers are widely used in residential and industrial applications for the interruption of electrical current in power lines upon conditions of severe overcurrent caused by short circuits or ground faults. One of the problems associated with the current interruption process during severe overcurrent conditions is arcing. Arcing, which is highly undesirable for several reasons, occurs between the contacts of circuit breakers used to interrupt the current. Arcing causes deterioration of the contacts and gas pressure to build up within the breaker. Arcing also necessitates circuit breakers with larger separation between the contacts in the opened position to ensure that the arc does not persist with the contacts in the fully opened position.

A circuit breaker normally has a magnetic tripping ("mag-trip") function which is performed by a coil or solenoid. When the current through the circuit breaker reaches a value higher than a predetermined value, for example, about 500% of the ampere rating, the circuit breaker trips instantaneously because of the magnetic force generated by the coil. The predetermined current value is the mag-level of the circuit breaker.

Present circuit breaker designs fail to address the fact that, absent a current limiting device, almost 100% of the interruption energy goes to generate an arc and pressure in the circuit breaker. This arc and pressure can create difficulties in the circuit breaker and end-use equipment. Additionally, an excessive magnetic force generated by a coil in present circuit breaker designs can result in armature damage upon tripping of the circuit breaker.

The apparatus and method of the present invention prevents the generation of excessive magnetic forces in circuit breaker coils and suppresses interruption energy by including a current limiting device which can be incorporated into or separate from the circuit breaker.

SUMMARY OF THE INVENTION

An apparatus and method for interrupting the flow of electrical current in a line is disclosed. The invention provides for better limitation of current than can be achieved in the prior art. With effective current limitation the magnetic force generated by the circuit breaker coil will not be excessive, thereby reducing potential damage to the circuit breaker armature, increasing the interruption rating of the circuit breaker and end-use equipment and decreasing the interruption pressure within the circuit breaker.

BRIEF DESCRIPTION OF THE DRAWINGS

For a detailed understanding of the present invention, references should be made to the following detailed description of the preferred embodiment, taken in conjunction with the accompanying drawings, in which like elements have been given similar numerals, and wherein.

DETAILED DESCRIPTION OF THE INVENTION

Figure 1:
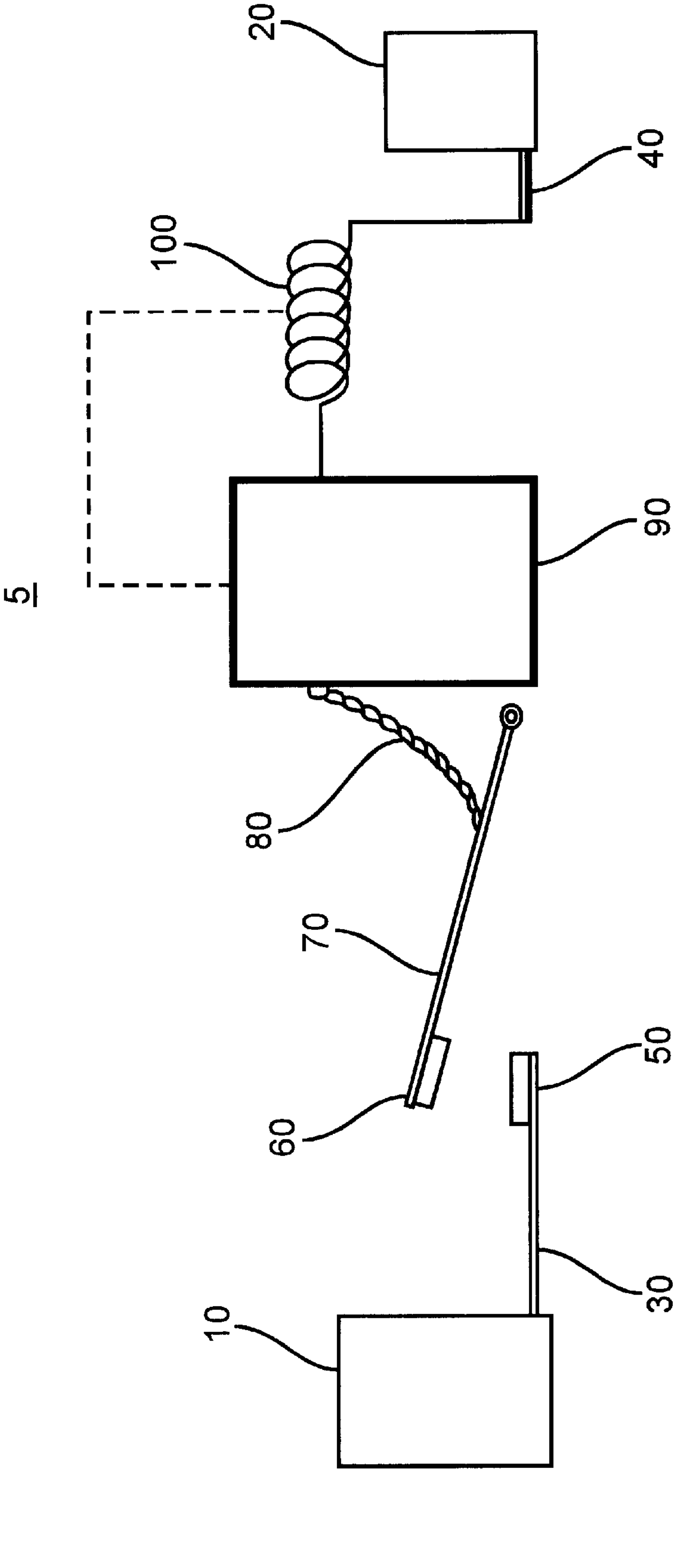
Fig. 1 PRIOR ART
FIG. 1 illustrates a prior art circuit breaker wherein the coil, which produces the magnetic force to trip the circuit breaker mechanism when the current reaches the mag-level, is made of copper.

FIG. 1 shows a prior art circuit breaker device 5 having a line lug 10 and a load lug 20. The line terminal 30 is affixed to the line lug 10 and the load terminal 40 is affixed to the load lug 20. A switch 45 comprising a stationary contact 50, moveable contact 60 and a blade 70 is contained within the circuit breaker device 5. The stationary contact 50 is connected to the line terminal 30 and the moveable contact 60 is connected to the blade 70, which is pivotally mounted in the circuit breaker device 5 so that contacts 50 and 60 can be closed and opened by a breaker mechanism 90. A flexible connector 80 is welded to the blade 70 and is electrically connected to a coil 100. The breaker mechanism 90 comprises many components and is represented by a box for simplicity. The coil 100 is directly connected in the circuit as a current carrying element. As mentioned above, the magnetic force produced by the coil 100 is strong enough to trip the circuit breaker when the current reaches the mag-level of the breaker. Under normal operations, the magnetic force generated by the coil 100 is too small to trip the circuit breaker. In the prior art, the coil is made from copper as a convention and engineering habit since copper is a good electrical conductor.

There are several disadvantages to the prior art device shown in FIG. 1. The coil 100 does not provide any appreciable current limiting effect when the circuit breaker interrupts a short circuit. Almost 100% of the interruption energy goes to generate arc and pressure in the existing circuit breaker design. Excessive interruption pressure within a circuit breaker creates difficulties in keeping end-use equipment intact.

Another problem associated with the prior art circuit breaker is armature breakage. The armature is an actuating component which trips the circuit breaker when a sufficient magnetic force is generated through the coil 100. The coil 100 can sometimes generate a magnetic force which is too strong for the armature material to withstand. Because of the high interruption pressure, the interruption ratings of the existing circuit breakers and the end-use equipment are lower than the interruption rating for fuses. Engineers commonly utilize fuses whenever there is a need for high interruption rating.

Figure 2:
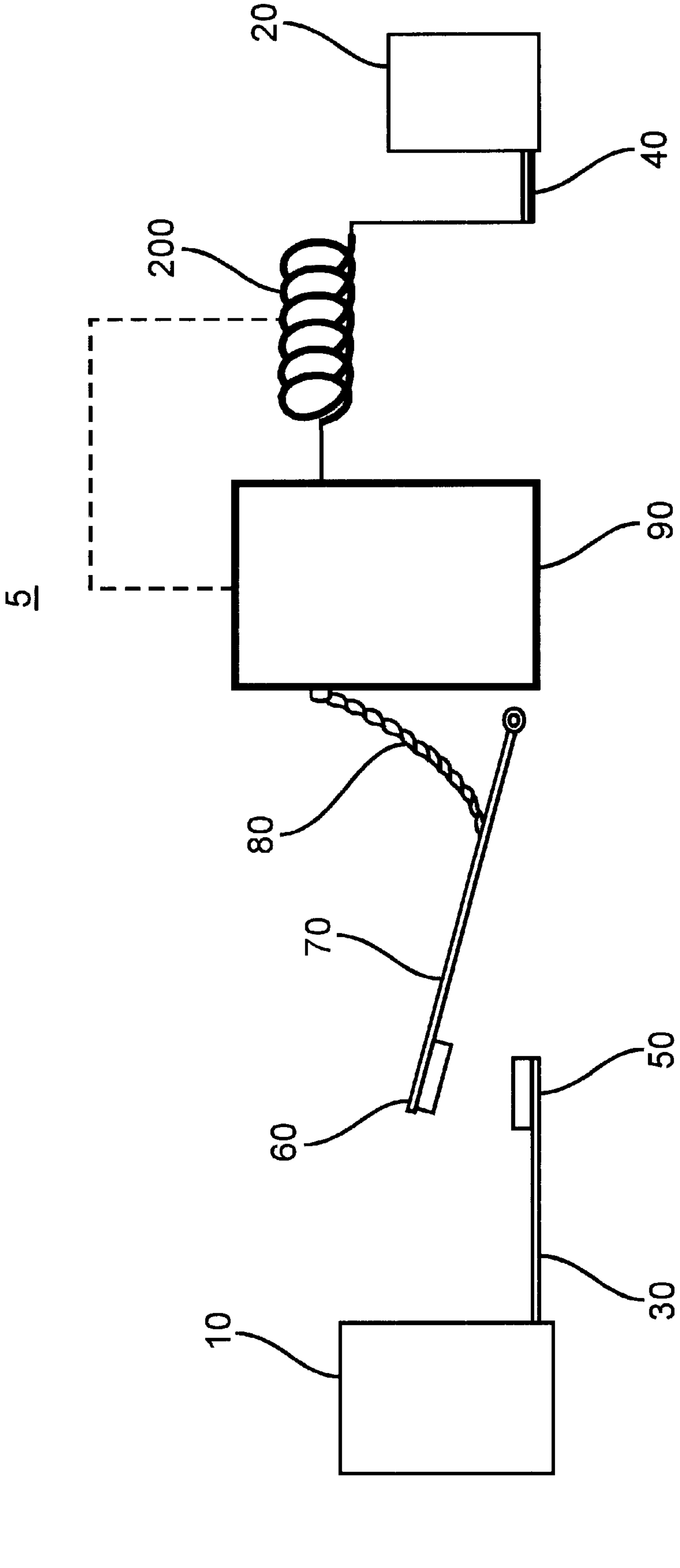
FIG. 2 illustrates the present invention wherein a circuit breaker PTC element, in the form of a coil, is used to functionally replace the conventional copper coil in FIG. 1 and limit the current to the circuit breaker.

FIG. 2 illustrates a preferred embodiment of the present invention. This invention provides for better limitation of current than can be achieved in the prior art. With an effective limitation of current, the magnetic force generated from the coil will not be excessive so as to result in the breakage of the armature. The invention can increase the interruption ratings of the circuit breakers and the end-use equipment and also lower the interruption pressure of the circuit breaker.

In FIG. 2, the coil 200 is preferably made of tungsten instead of copper. The remaining components are the same as those in FIG. 1. The coefficient of resistivity of the tungsten versus temperature is positive. The flow of the overcurrent through the coil heats the coil thereby increasing its resistance and limiting the buildup of the overcurrent. The resistance of the tungsten coil 200 can increase about 15 times its room temperature value during a short circuit because of the positive temperature coefficient effect. The resistance added by the tungsten PTC (TPTC) coil 200 limits the let-through current and absorbs a significant portion of the interruption energy in a short circuit. The cold resistance of the TPTC coil 200 is designed in the same manner as that of the copper coil 100 in FIG. 1 to meet Underwriter Laboratories® temperature standards. Resistance is a contributing factor to an increase in temperature in the circuit breaker, however, the TPTC coil 200 does not cause any heat problems for the circuit breaker under normal operations.

There are many ways to use this invention in designs of various circuit breaker products. A major guideline in the design of the present invention is thermal management. The TPTC coil 200 should be designed so that it does not create any increased thermal problems when the breaker carries 100% of the rated current. However, the TPTC coil 200 should be heated to a temperature below its melting point when a short circuit current occurs at the highest interruption rating of the circuit breaker. The diameter and the length of the TPTC coil 200 should be designed to ensure correct thermal management.

Figure 3:
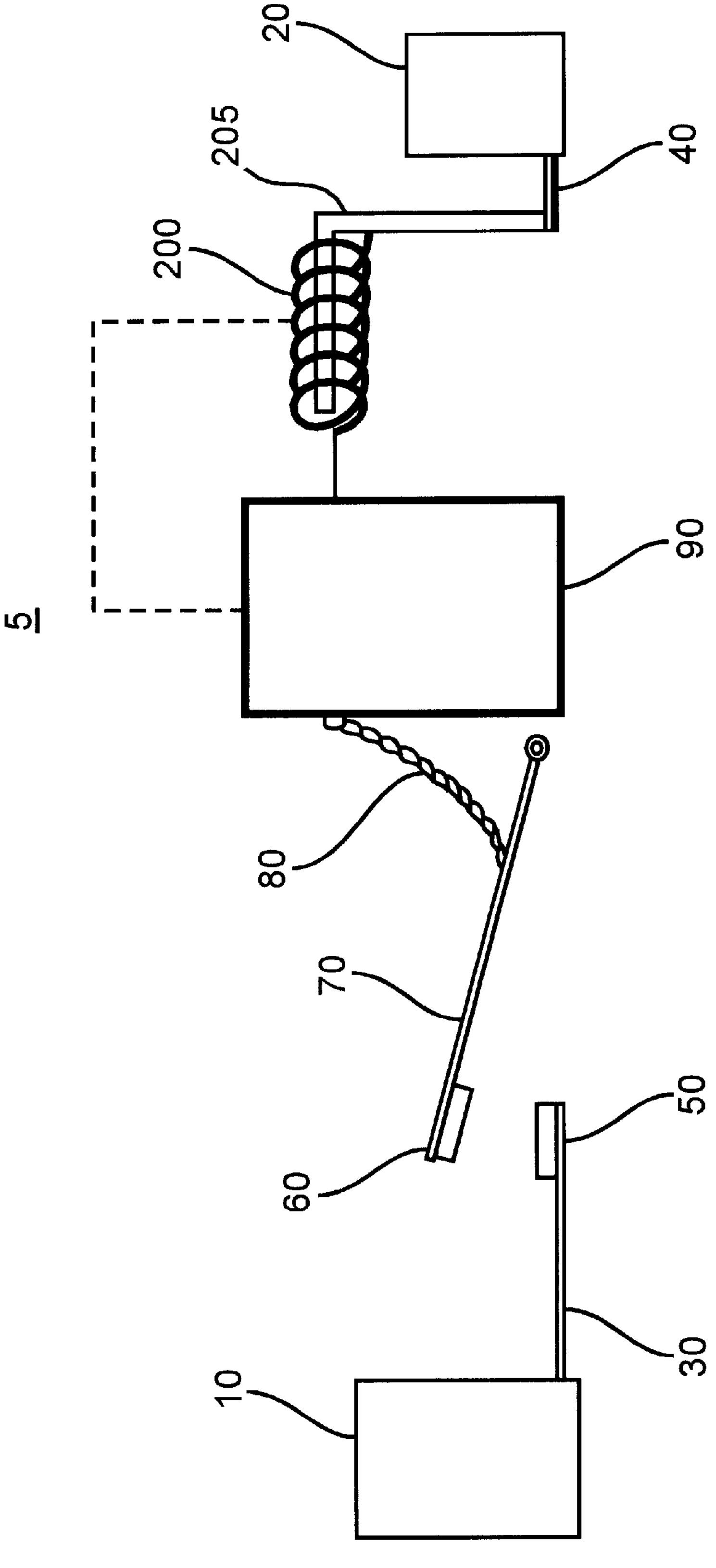
FIG. 3 illustrates an alternative embodiment of the present invention wherein a copper conductor is combined with a PTC element in order to dissipate heat from the PTC element during normal operations of the circuit breaker.

FIG. 3 illustrates an alternative embodiment of the present invention. The embodiment in FIG. 3 includes a metallic conductor 205, preferably made from copper, in addition to the elements contained in the circuit illustrated in FIG. 2. One end of the TPTC coil 200 is connected to one end of the metallic conductor 205 and other end of the metallic conductor 205 is attached to the load terminal 40. The metallic conductor 205 is designed to carry heat away from the TPTC coil 200 under normal operations. Under normal operations, the TPTC coil 200 generates a certain amount of heat because of Ohmic heating from the current which passes through the coil. Cooper is a good conductor of electrical energy and heat. Therefore, it is beneficial to utilize a copper element as a heat sink and conductor in the preferred embodiment.

Figure 4:
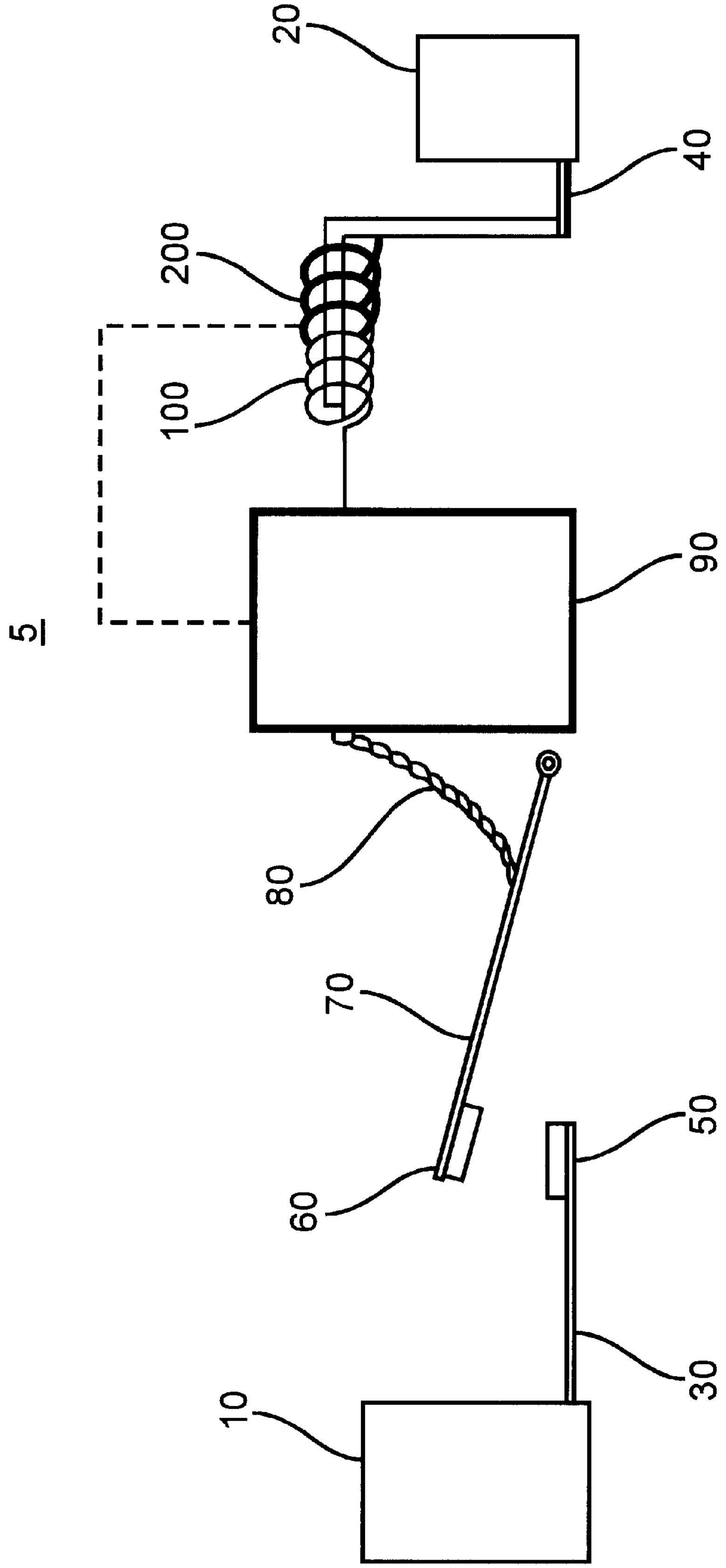
FIG. 4 illustrates an alternative embodiment of the present invention wherein a PTC element, in the form of a coil, is connected with a copper coil. The PTC element produces the magnetic force to trip the circuit breaker mechanism and functions as a current limiting device. The copper coil is connected to the PTC element to assist in producing the magnetic force to trip the circuit breaker mechanism which the PTC element cannot achieve alone because of design parameters.

FIG. 4 illustrates an alternative embodiment of the present invention. As shown in FIG. 4, a TPTC coil 200 and a coil 100, preferably made from copper, are connected together to produce the magnetic force to trip the circuit breaker mechanism 90. The TPTC coil 200 also functions as a current limiting device. Certain resistance parameters in a circuit breaker must be maintained in order to meet Underwriter Laboratories I temperature standards. The resistance parameters limit the length of the TPTC element. In this embodiment, the limited length of the TPTC element results in a limited number of turns of the TPTC coil 200. In some applications, the TPTC coil 200 may have an insufficient number of turns to provide an effective magnetic force. Therefore, the coil 100 is connected to the TPTC coil 200 to assist in producing the magnetic force to trip the circuit breaker mechanism 90 to which the TPTC coil 200 cannot achieve alone because of design parameters.

Figure 5:
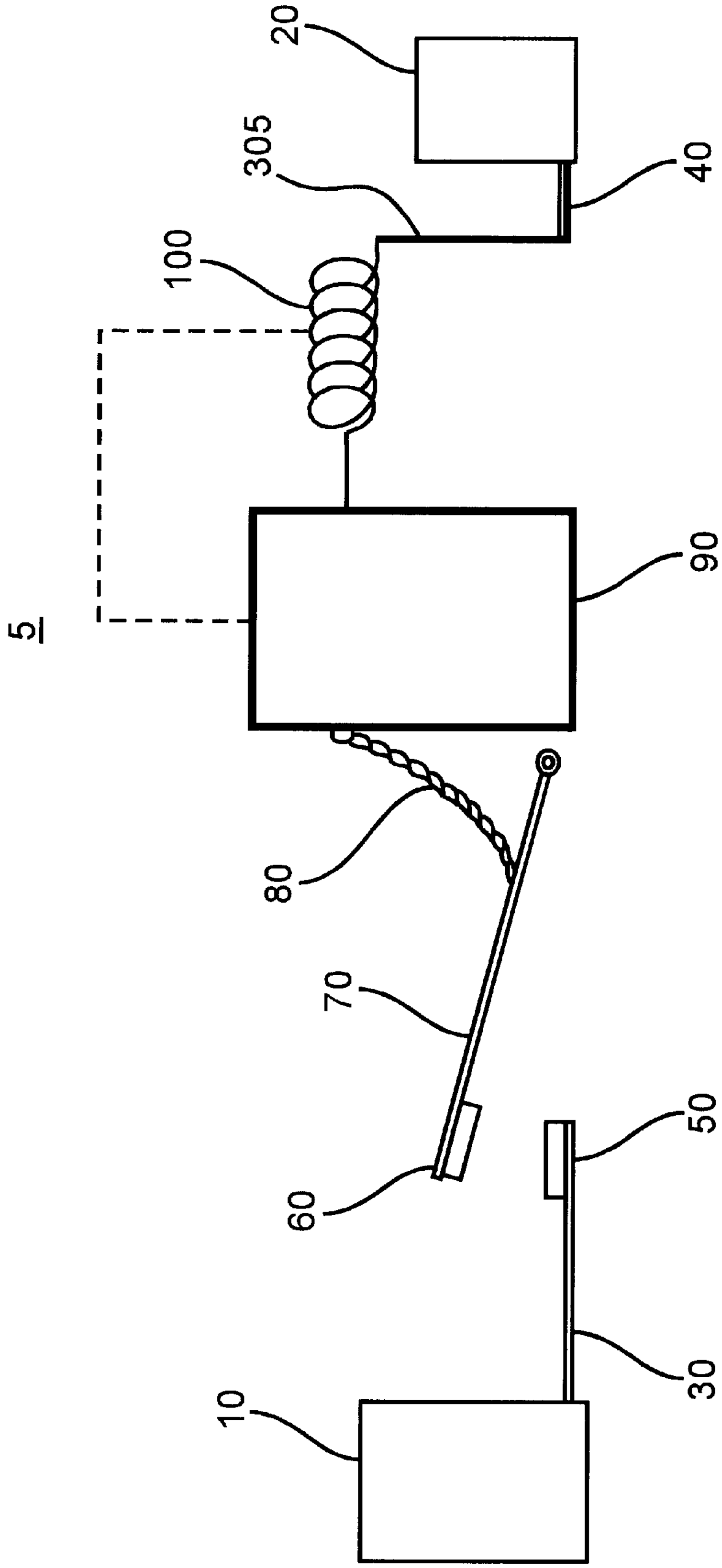
FIG. 5 illustrates an alternative embodiment of the present invention wherein a copper coil produces the magnetic force to trip the circuit breaker mechanism and a tungsten conductor, placed in series within the circuit, functions as a current limiting device.

The tungsten element is not limited in that it must be in the form of a coil. FIG. 5 illustrates another embodiment of the present invention. In FIG. 5, the coil 100 is made preferably from copper and produces the magnetic force to trip the circuit breaker mechanism 90. A conductor 305, preferably made from tungsten, is connected in series in the circuit and functions as a current limiting device. The conductor 305 can be in the form of a wire element or rectangular rod. The physical placement of the conductor 305 in the circuit breaker is immaterial as long as the conductor 305 is connected in series in the circuit.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A method of interrupting the flow of electrical current in a line, comprising the steps of:

connecting a switch having an opened position and a closed position in series with the line;

coupling a breaker mechanism adapted to be actuated by at least one activating signal to move said switch from said closed position to said opened position wherein the flow of electrical current in the line is interrupted; and connecting a current limiting device having a substantially metallic positive temperature coefficient resistivity element in series with said switch and the line for producing a magnetic force to trip said breaker mechanism, said magnetic force being said at least one activating signal.

2. The method of interrupting the flow of electrical current in claim 1, wherein said positive temperature coefficient resistivity element is made substantially from tungsten.

3. The method of interrupting the flow of electrical current in claim 1, wherein said at least one activating signal includes an over current produced by a short circuit.

4. The method of interrupting the flow of electrical current in claim 1, wherein said at least one activating signal includes an over current produced by a ground fault.

5. The method of interrupting the flow of electrical current in claim 1, further comprising the step of preventing damage to said switch upon transmission of said at least one activating signal by limiting current to said switch.

6. The method of interrupting the flow of electrical current in claim 1, further comprising the step of connecting a conductive element to said positive temperature coefficient resistivity element to dissipate heat from said positive temperature coefficient resistivity element during normal operations.

7. The method of interrupting the flow of electrical current in claim 1, further comprising the step of limiting said magnetic force generated by said positive temperature coefficient resistivity element.

8. A circuit breaker for interrupting the flow of electrical current in a line, comprising:

a switch connected in series with the line, said switch having an open position and a close position;

an breaker mechanism coupled to said switch, adapted to be actuated by at least one activating signal, to move said switch from the closed position to the open position; and a current limiting device having a substantially metallic positive temperature coefficient resistivity element in series with said breaker mechanism for producing a magnetic force to trip said breaker mechanism, said magnetic force being said at least one activating signal.

9. The circuit breaker in claim 8, wherein said positive temperature coefficient resistivity element is made substantially from tungsten.

10. The circuit breaker in claim 8, wherein said at least one activating signal includes a ground fault over current.

11. The circuit breaker in claim 8, wherein said at least one activating signal includes a short circuit over current.

12. The circuit breaker in claim 8, further comprising a conductive element connected to said positive temperature coefficient resistivity element to dissipate heat from said positive temperature coefficient resistivity element.

13. The circuit breaker in claim 12, wherein said conductive element is made of copper.

14. The circuit breaker in claim 8 wherein said current limiting device is adapted to selectively trip said breaker mechanism.

15. The circuit breaker according to claim 8 wherein said current limiting device further comprises a copper element to assist in tripping said breaker mechanism.

16. The circuit breaker according to claim 8 further comprising a copper element for producing a magnetic force to trip said breaker mechanism.

17. The circuit breaker according to claim 8 wherein said resistivity element is shaped in one of a wire element, a rectangular rod and a coil.

18. The circuit breaker according to claim 8 wherein said resistivity element is configured to limit let-through current and absorb a significant portion of interruption energy in a short circuit.

* * * * *